United States Patent [19]

Novak

[11] 4,285,717

[45] Aug. 25, 1981

[54] METHOD OF INITIATING OPERATION OF TUBULAR HEAT EXCHANGER FOR PREHEATING PULVEROUS GLASS BATCH

[75] Inventor: John D. Novak, Sylvania, Ohio

[73] Assignee: Owens-Illinois, Inc., Toledo, Ohio

[21] Appl. No.: 150,855

[22] Filed: May 19, 1980

[51] Int. Cl.³ .............................................. C03B 3/00
[52] U.S. Cl. ......................................... 65/134; 65/27;
       65/335; 165/2; 165/101; 165/103; 165/104.18
[58] Field of Search ............... 65/27, 134, 335; 165/2,
       165/101, 103, 106

[56] References Cited

U.S. PATENT DOCUMENTS

| | | | |
|---|---|---|---|
| 3,607,190 | 9/1971 | Penberthy | 65/27 X |
| 3,880,639 | 4/1975 | Bodner et al. | 65/134 |
| 4,045,197 | 8/1977 | Tsai et al. | 65/27 |
| 4,113,459 | 9/1978 | Mattmuller | 65/335 X |
| 4,184,861 | 1/1980 | Erickson et al. | 65/134 X |

Primary Examiner—Arthur D. Kellogg

Attorney, Agent, or Firm—E. J. Holler; M. E. Click; D. H. Wilson

[57] ABSTRACT

The present invention relates to a method for initiating the preheating of pulverous materials in a tubular heat exchanger prior to their introduction into a melting furnace, with particular application to the recycling of all of the vitrifiable starting materials through the heat exchanger to eliminate moisture therefrom prior to delivery to a tank furnace for glass making to raise its entry-level temperature and improve furnace efficiency. The method involves rapidly recirculating all of the moisture-containing pulverous glass batch material through the open-ended tubes of a tubular sheet exchanger to heat the same and collect and remove moisture therefrom prior to initiation of delivery of any of the glass batch material in preheated condition to the glass melting furnace. The subject invention, as hereinafter described, is of particular utility to the glass industry, but it is to be understood that it is also applicable to other types of preheaters and furnaces.

10 Claims, 2 Drawing Figures

METHOD OF INITIATING OPERATION OF TUBULAR HEAT EXCHANGER FOR PREHEATING PULVEROUS GLASS BATCH

This invention constitutes an improvement to the invention disclosed in co-pending U.S. patent application entitled, "Method And Apparatus For Preheating Pulverous Materials Prior To Their Introduction Into A Melting Furnace", U.S. Ser. No. 161,091, filed Apr. 11, 1980, filed in the name of Robert R. Rough, and assigned to the same common assignee as the present application.

BACKGROUND OF THE INVENTION

1. Field of the Invention

Various types of manufacturing processes are known in which the starting materials are introduced into the furnace while cold or at ambient temperature by the use of either continuously or discontinuously operating devices. Such devices are frequently protected by a hydraulic or other cooling apparatus which absorbs the heat from the furnace and additionally intensifies the cooling of the materials introduced into the furnace. In these methods, the starting materials are subjected to heating only after they have been introduced into the furnace where they receive, at high temperature, the quantities of heat necessary for melting them, for ensuring completion of the endothermic reactions, and for imparting thereto sufficient fluidity to ensure homogenization and refining of the resultant molten glass mass. It has been observed in glass making that the greater part of the heat delivered to the starting materials is directed to increasing the temperature of the starting materials rather than to producing the desired endothermic reactions. In most known methods, the starting materials are deposited on top of the molten bath and are subjected to radiation from the flames circulating with great turbulence above them. Since the newly-introduced materials are poor conductors of heat, the heat exchange is poor which slows the melting process, thus requiring greater quantities of heat.

The present invention especially relates to increasing the fuel efficiency and output of glass melting installations, and provides means whereby a glass melting furnace may be operated continuously and uniformly at full capacity or beyond, if desired. A method is provided for initiating the preheating of thoroughly-mixed, moisture-containing, glass-forming ingredients before the same are supplied to the glass melting furnace. The method preferably utilizes the heat of the waste gases from the melting furnace in such preheating of the glass-forming constituents and effects rapid, continuous and repeated passage of the glass-forming batch mixture through the preheater to heat the same to a temperature above the boiling point temperature of water prior to its introduction into the melting furnace. The method is of special utility whether or not the batch mixture contains cullet.

The invention comprises an improved process to accomplish the aforesaid objects, and in the provision of an improved procedure for starting the preheating of the glass mixture in a tubular heat exchanger for utilizing waste gases from the glass melting furnace, as more fully set forth in the following specification, and as particularly pointed out in the appended claims.

The provision of the preheater for the glass mixture enables the utilization, for preheating the same, of the heat in the hot waste gases from the melting furnace which otherwise would go to waste up the stack. While the use of hot waste gases is preferred to operate the preheater, preheated air from the furnace heat-recovery "checkers" area which is usually used for combustion, or a supplemental heat source such as an oil or gas burner, alone or in combination. Also, the provision of the preheater, continuously delivering glass mixture at a proper predetermined elevated temperature, to a furnace, which is used with either continuous or batch process, permits more uniform operation of the furnace with a significant increase in fuel efficiency during operation, and in the output of the furnace. The start-up of a gravity-operated tubular heat exchanger having a plurality of spaced-apart, open-ended tubes is often impeded by pluggage of the tubes due to moisture condensation on the cooler material within the tubes. This condition occurs when the vaporized moisture tends to move upwardly in the tubes and collects upon the surfaces of the cooler or ambient temperature material moving downwardly through the tubes. The present method obviates such difficulties.

2. Description of Prior Art

There is a considerable number of earlier-issued U.S. patents which deal with initially preheating the glass mixture prior to its delivery into the glass furnace. U.S. Pat. No. 3,607,170 to Malesak discloses method and apparatus in which the glass mixture is preheated in a non-oxidizing atmosphere while being advanced in a given direction through a preheating zone of a tunnel kiln. A mixture of glass powder and foaming agent is delivered into a hopper having a series of tubes through which the mixture passes.

U.S. Pat. No. 3,172,648 to Brichard relates to preheating of pulverous materials in which the flow of the fumes in the preheating zone is in direct contact with the glass forming ingredients, such contact causing an entrainment of dust in the emitting fumes.

U.S. Pat. No. 4,045,197 to Tsai et al relates to apparatus and method for recovering the waste heat from the exhaust gases of a glass melting furnace and transferring the same by heat pipes to an enclosure in which incoming glass batch materials are preheated prior to being fed to a furnace for melting. The heat pipes contain metallic sodium as the working fluid.

U.S. Pat. No. 3,788,832 to Nesbitt et al, and U.S. Pat. No. 3,880,639 to Bodner et al, owned by the same common assignee as the present application, both relate to the preheating of agglomerated glass batch materials by direct contact with a gaseous effluent being exhausted from a glass melting furnace.

U.S. Pat. No. 3,185,554 to Sweo et al relates to a method of preheating glass batch materials by independent heating means other than exhausted effluent so that there is no unpredictable relationship between varying amounts of waste heat and the amount of heat provided for preheating unmelted batch materials.

A considerable number of other patents relate to the direct heat exchange between incoming batch materials and exhaust gases from a glass melting furnace. These U.S. Pat. Nos. are: 3,607,190—Penberthy, 4,026,691—Lovett, 3,526,492—Motsch, 3,350,213—Peyches, 1,543,770—Hilbert, 3,753,743—Kukuda, 1,610,377—Hitner, and 4,099,953—Rondeaux. Many techniques have been disclosed in the patent literature for direct and indirect heat exchange between hot exhaust gases from a glass melting furnace and incoming batch materials. However, none of the listed prior art references relate to a start-up process for preheating moisture-containing pulverous glass batch materials which are preheated by gravity flow through a tubular heat exchanger having open-ended tubes.

DESCRIPTION OF THE PREFERRED EMBODIMENT

Figure 1:
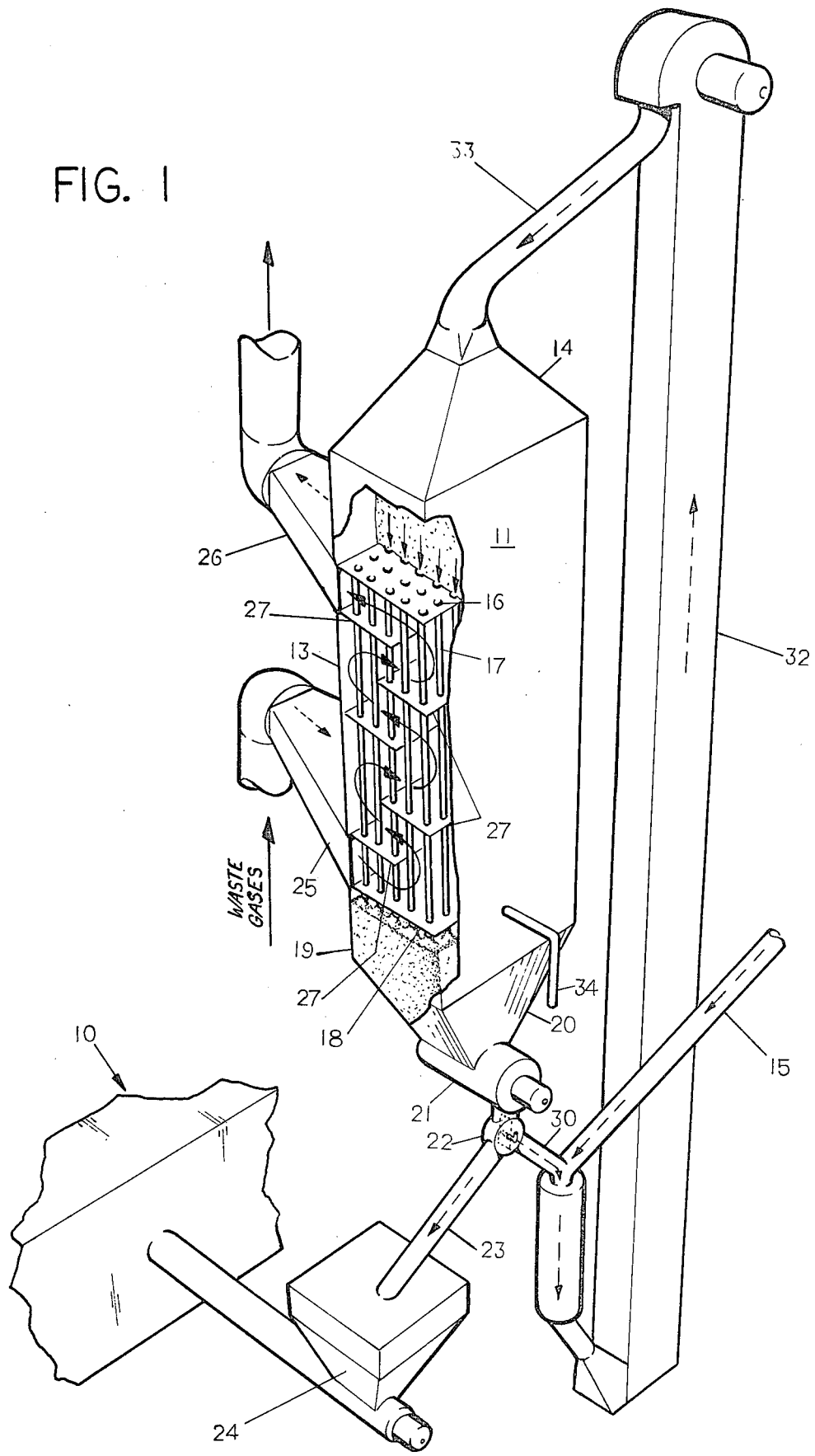
FIG. 1 is a perspective view partially broken away of the glass batch preheater apparatus for practicing the present invention.
Figure 2:
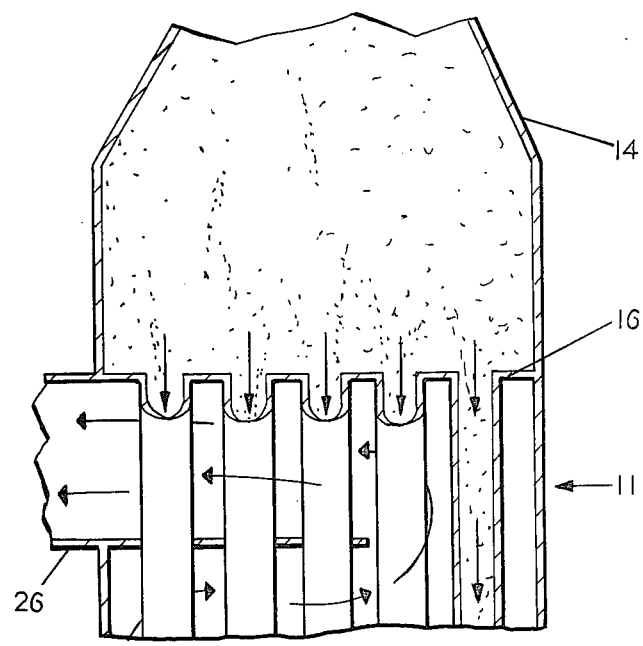
FIG. 2 is an enlarged fragmentary vertical sectional view of the preheater apparatus shown in FIG. 1.
Figure 2:
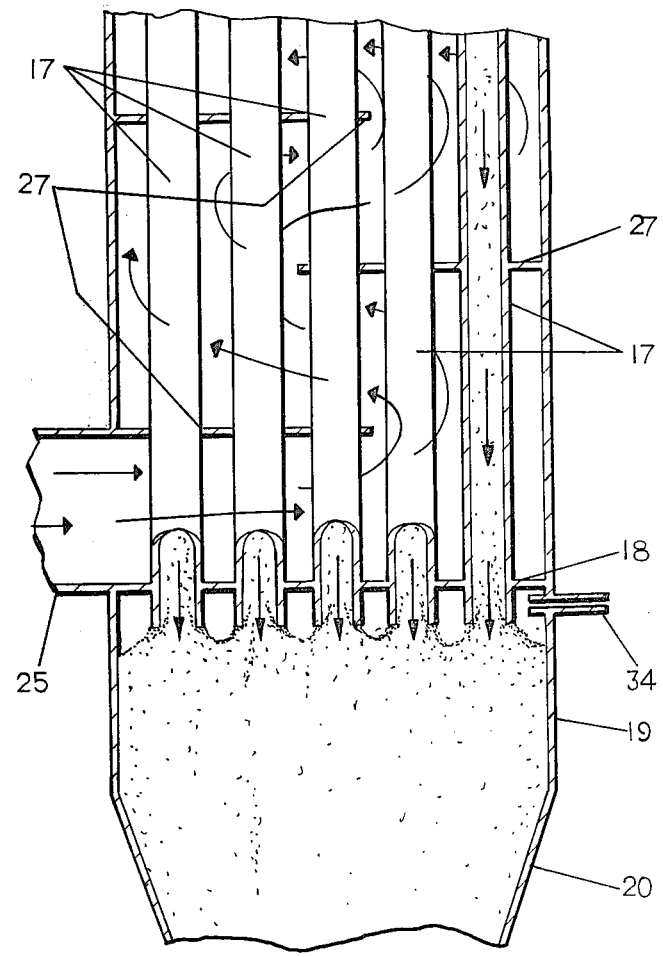

Referring to the drawings, a glass melting furnace 10 of the regenerative type having a bottom of fire brick, whereon the melt of glass forming ingredients is deposited, is indicated schematically in FIG. 1. Gas and air are normally mixed and burned in the furnace above the glass forming materials and the resulting heat melts the mixed materials to a mass of molten glass, which is delivered or worked from one end following refining. The regenerative or heat-accumulating chambers or passageways of the furnace are normally located beneath the furnace melting chamber.

The gas and air are usually passed through the regenerative passages beneath the furnace bottom for preheating and through side ports which lead into the furnace melting chamber where they are burned to melt the glass forming materials. The hot waste gases are then passed through opposite side ports and then through the regenerative passages for heat recovery and then to flue ducts and a discharge stack. After a limited period of operation in this manner, the path of travel of the incoming gas and air is switched, by suitable dampers and timers, so that the combustible gases then enter the melting chamber from opposite ports, the hot waste gases then being conducted through opposite flue passages and ducts to the stack. By the alternate use of the regenerative passages for incoming combustion air and outgoing hot waste gases, the incoming combustion air is preheated by the bricks of the regenerative passages which have been heated by the escaping flue gases which previously passed therethrough. All of the foregoing description pertains to well known glass furnace construction and is merely set forth by way of example, although other types of furnaces may also be employed in conjunction with the present invention.

In accordance with the present invention, a preheater 11 is mounted adjacent to the batch feeding end of the glass furnace, which is normally fed by batch chargers 12. The glass forming ingredients in suitably intermixed condition are delivered to the top of the preheater 11 by any suitable means, such as a vertical elevator 32. The vertical elevator may consist of any endless chain or bucket-type arrangement of standard construction, capable of taking the glass forming mixture from a pile or hopper and delivering it into a chute through which it passes into the top of the preheater 11. The glass forming mixture comprises the normal intermixed batch constituents and may or may not contain broken cullet of prescribed size for forming the glass melt. The cullet normally has a size ranging from about ½ to 1 inch U.S. mesh size, and the smaller size being preferred for passage through the tubular preheater to prevent bridging.

The preheater typically comprises a vertical chamber 13 having a rectangular cross-section with a frustopyramidal top chamber 14, or a rectangular channel. The main mass of glass batch is delivered through a chute 15 into the bottom area of vertical elevator 32 for delivery to the top chamber of preheater 11. Between the enclosed top chamber and the main body portion of the preheater is located an interior horizontal tube sheet 16 into which a plurality of open-ended tubes 17 are headed at their upper ends. The tubes are mounted in spaced-apart array in parallel, vertical alignment for passage of the glass batch therethrough. The tubes preferably have about a 4 inch internal diameter and extend throughout the central portion of the preheater to an interior horizontal tube sheet 18 into which they are similarly headed. Thus, the central portion of the preheater comprises a shell and tube arrangement. The number of tubes and dimensions of the preheater will depend upon the size of the glass melting furnace with which it is used, and the desired conditions of use. The tubes are mounted on about 6 to 8 inch centers where 4 inch internal diameter tubes are employed, the corner tubes usually being omitted where the preheater has a rectangular or square horizontal cross-section. The tubes are preferably comprised of carbon or stainless steel for long term use without rusting or corrosion, and are normally equi-spaced for optimum particulate batch flow therethrough.

The lower region of the preheater comprises a frustopyramidal bottom hopper 20 into which the open-ended tubes 17 deliver the heated glass batch. The bottom hopper terminates at its lower extremity into a screw-driven batch removal chamber 21 which interconnects with a diverter valve 22. The diverter valve has a Y-shaped exit portion for directing the major portion of the heated glass batch through a chute 23 to a batch charger 24. The batch charger is capable of delivering the heated glass batch into the furnace 10, after it is properly preheated, through a screw-driven feed member or other means as known in the art.

Immediately above the bottom interior tube sheet 18 of the preheater, an incoming waste gas duct 25 is mounted for delivering hot waste gases into a lower region of the preheater. The duct is designed to open out into a relatively-flat, wide duct inlet having a width comparable to the preheater dimension for introducing the hot gases across its full width.

Immediately below the upper interior tube sheet 16 of the preheater, an outgoing waste gas duct 26 is mounted for removing hot waste gases from an upper region of the preheater. The duct consists of a relatively-flat, wide outlet having a width comparable to the preheater dimension for removing the hot gases across its full width.

A plurality of flat baffle plates 27 is mounted in horizontal, spaced-apart, staggered array within the preheater between the upper and lower interior tube sheets 16 and 18. The baffle plates 27 have openings therein through which the tubes 17 extend between their upper and lower extremities. The baffle plates are able to direct the upwardly-coursing hot waste gases in a circuitous path to provide turbulence to the gases and thereby improved heat transfer to the tubes and indirectly to the glass batch moving downwardly by gravity therewithin.

The batch mixture passes gradually and continuously through the preheater from top to bottom by gravity. It is then delivered, uniformly heated and well mixed from the bottom hopper region of the preheater to the diverter valve 22 above the glass batch charger 24 of the furnace. The glass batch is thus advanced slowly and continuously downwardly to the furnace area for subsequent melting.

In practicing the present invention, the intermixed glass batch constituents are introduced into the upper hopper area or top chamber of preheater at ambient temperature upon start-up of the apparatus. The batch materials are either conveyed upwardly by elevator 32 or other means to initiate heating of the batch materials during their passage through the tubes 17. The batch materials are rapidly and continuously recirculated through the preheater prior to delivery of any of the preheated material to the furnace.

The glass batch in the preheater is indirectly heated by the hot waste gases which are taken from the furnace prior to their arrival at the stack. As shown, the hot gases enter the bottom region of the preheater near the lower end of the tubes and above lower tube sheet 18, the gases then passing in a serpentine path around the staggered baffle plates 27 to the top of the preheater at upper tube sheet 16, and then escaping from the preheater through outlet duct 26. Inlet and outlet ducts 25 and 26 may be provided with dampers so that the flow of hot gases through the preheater may be accurately regulated. The gases passing upwardly in cross flow, moving generally upwardly to the descending glass-forming materials within the tubes, moves between and around the tubes heating the same and indirectly the contained glass batch within the tubes. Further, the hottest gases thus act upon the hottest portion of the glass forming constituents in the lower area of the preheater, adding a further increment to its heat before it is recycled through the preheater.

In accordance with the present invention, upon start-up of preheating the batch, all of the batch charged into the preheater is recirculated through the preheater at a flow rate at least twice the normal rate of operation of the heat exchanger during later delivery of preheated batch to the melting furnace. The batch is introduced into the preheater at ambient temperature and recycled through the heat exchanger until all of the pulverous batch material is preferably maintained at about two to four times the normal rate of operation when the heat exchanger is subsequently continuously operated to deliver preheated material to the furnace batch charger 24 through duct 23.

The water vapor and residual moisture from the batch tends to collect in an upper region of the lower hopper area 19, from which it is vented by a vent pipe 34. The residual moisture is driven from the batch materials during their progressive heating and downward travel through the tubes so that as the batch falls free from the tube lower ends which extend below the bottom tube sheet 18, the moisture and water vapor can be collected and expelled from such area. It has been found that operating the preheater with its normal volume of batch material being recirculated appreciably faster for at least a two hour period, the entire mass of batch at the top of the preheater will attain a temperature of about 250° F. Continued operation of the preheater with the same recycled batch for about an additional one hour will then result in all of the material within the tubes reaching the minimum preheater operating temperature, i.e., all contained batch material being above the boiling point temperature of water.

By proper design of the upper and lower hopper sections of the preheater, such areas preferably having generally frusto-pyramidal shapes, relatively uniform and smooth flow of the batch materials through the entire vertical height of the tubes of the preheater is attained. Thus, flow rates of the batch through all of the heat exchanger tubes, to maintain the same virtually-full at all times, is obtained for uniform amounts of preheat. The preferred form of construction for such upper hopper is one having a straight section with a hollow chamber above the tubes, and a wedge-shaped hopper with rounded corners at the bottom at the tube lower ends for continuous movement of the hot, relatively-dry batch. A sufficient head is thereby maintained over the tubes to secure such flow, along with a suitable feeder unit to remove preheated material from the bottom of the hopper.

The batch normally has a 0 to 1 percent by weight water content, and when the preheater is started at normal rates of material throughput, the preheater tends to plug by moisture condensation on the cooler material in the upper regions of the preheater, thus preventing or seriously hindering proper preheater operation.

The preheater is started with normal, wet batch having at least some residual moisture, usually from 0.1 to 3 percent by weight, the higher amount being approached when cullet is included. If the preheater is designed to preheat and deliver 15 tons per day of heated batch, for example, with one third being recycled for maintaining the preheater at a minimum operating temperature, thus totaling 20 tons the start-up of the preheater would preferably involve recycling 3 times 20, or 60 tons per day, at 100% recycle, with no input of cold material or no withdrawal of hot material, until such time as the entire mass of batch is heated above the boiling point temperature of water to drive out the residual moisture. Such operation involves very fast flow rates of material inside the tubes to allow the moisture to condense on the core of the material. Thus, the moisture all goes out the bottom of the tubes for evaporation in that area from which it can be expelled through vent pipe 34.

The material is preferably passed through the tubes sufficiently fast to initially keep the central core of material at a temperature of about 150° F. or cooler for condensation of the moisture thereon. The material in close proximity to the tube sidewall being hotter drives the moisture inwardly, thus allowing smooth, uniform flow of the material within the tubes. When the batch material contains no cullet, the material may be recycled through the preheater more slowly. When the batch material contains cullet, the material should be recycled through the preheater faster due to the thermal conductivity factor of such material.

The diverter valve 22 serves to separate the downwardly flow stream of glass batch mixture into output and recycle portions once the contained batch material is all suitably preheated. In normal operation, the output portion is delivered into the batch charger 24 through chute 23, after substantially all of the batch material in the preheater is heated above 212° F., while the recycle portion is deliveed into chute 30 where it is mixed with incoming cold batch from the supply source to preliminarily heat the latter. The mixed hot and cold batch is then moved downwardly to the bottom of vertical conveyor 32 which serves to elevate the batch and deliver same into the top of the preheater through inlet chute 33.

Through proper proportioning and thorough mixing of the recirculated hot batch fraction and the newly-incoming cold batch fraction, uniform and continuous operation of the preheater apparatus can then be practiced. This can be accomplished when the temperature conditions, and the flow of gases and batch material, are properly adjusted. Such uniform operation permits the maintenance of substantially-constant conditions within the preheater for delivering significantly-hotter glass batch to the furnace greatly increasing the furnace fuel efficiency.

The temperature of the stack gases entering the preheater will vary with furnace conditions, of course; however, they will normally be from 900° F. to 1100° F. for substantial periods. The gases leaving the preheater will range from about 400° F. to 600° F.

Obviously, additional heating means for the preheater may be provided, if desired, although the waste furnace gases are usually fully adequate for most economical operation. The waste gases normally enter the preheater at a temperature of about 900° F. to 1100° F. after leaving the furnace checkers area. As stated, preheated combustion air which has passed through the furnace heat-recovery area can also be used to heat the batch, or a supplemental separate heat source such as a burner may be used.

After preheater recycling operation to raise the batch temperature above 212° F., the glass batch mixture usually enters the top of the preheater at about 250° F. and leaves the preheater at the diverter valve 22 having a temperature ranging from about 800° F. to 1000° F. The foregoing temperatures are attainable with the amount of recirculated batch ranging from about 25 to 30 percent by weight. Such temperatures are possible with a glass furnace which is capable of manufacturing about 240 tons per day of product.

The present invention is capable of operation when the newly-introduced glass batch in the cooler upper region of the preheater is initially below the boiling point temperature of water. When the batch temperature in such region is below the boiling point temperature of water, the residual moisture within the batch is able to condense within the tubes, and within the top cover member 14 of the preheater, causing pluggage of the tubes and bridging of the normally flowable mass. Such pluggage prevents operation of the preheater and cannot be tolerated in long-term operation. Upon starting the preheater, the present method permits elevating all surfaces of the preheater contacted by the batch to a temperature above the dew point temperature or boiling point temperature of water contained in the batch, and due to rapid throughput of the batch material, batch adherance to contacted tube surfaces can be prevented and smooth flow maintained.

The present invention is not limited to the interaction of one preheater to one melting furnace, the former being connected with hot gases leading to one stack. If desired, one preheater may be connected to serve a number of melting furnaces, or a number of preheaters may be associated with one furnace and the waste gases emitting therefrom.

Various modifications may be resorted to within the spirit and scope of the appended claims.

I claim:

1. The method of initiating the preheating of a pulverous, moisture-containing material such as glass batch, and the like, within a tubular heat exchanger prior to delivery of such material in preheated condition to a melting furnace comprising the steps of introducing the fully-intermixed, pulverous material into the upper region of a tubular heat exchanger, allowing the pulverous material to flow downwardly by gravity thorugh a plurality of open-ended tubes of said heat exchanger, passing the hot waste gases of the melting furnace through said heat exchanger around said open-ended tubes to heat the pulverous material contained therein by indirect heat transfer, recirculating all of the pulverous material rapidly through the tubes of said heat exchanger during start-up while the said pulverous material is heated by contact with the tube inner surfaces, said material being recycled at a substantially-faster flow rate than when the heat exchanger is subsequently continuously operated to preheat the pulverous material for delivery to said melting furnace.

2. The method in accordance with claim 1, wherein said pulverous material is recirculated through said heat-exchanger at a flow rate at least twice the normal rate of operation of said heat-exchanger prior to delivery of any preheated pulverous material to said melting furnace.

3. The method in accordance with claim 1, wherein said pulverous material is recycled through said tube-type heat exchanger until essentially all of said pulverous material is at a temperature above the boiling point temperature of water.

4. The method in accordance with claim 1, wherein said pulverous material is recirculated through said heat exchanger at a flow rate of about two to four times the normal rate of operation of said heat exchanger until essentially all of said pulverous material is at a temperature above the boiling point temperature of water prior to delivery of any preheated pulverous material to said melting furnace.

5. The method in accordance with claim 1, including the steps of collecting the water vapor and resultant moisture from the batch in a region at the lower end of the open-ended tubes of said heat exchanger and removing such moisture from said heat exchanger.

6. The method in accordance with claim 5, including the step of recirculating the said pulverous material rapidly through said heat exchanger for a sufficient period of time to remove essentially all moisture from said pulverous material.

7. The method in accordance with claim 5, including the step of providing a vent tube for removal from said heat exchanger of said water vapor and resulting moisture from said pulverous material at an enclosed hopper area of said heat exchanger adjacent the lower end of said open-ended tubes.

8. The method of initiating the preheating of pulverous moisture-containing glass batch material, or the like, within a tubular heat exchanger prior to the start of its delivery to a glass melting furnace, said method comprising the steps of introducing the fully-intermixed pulverous glass batch material into the upper region of the tubular heat exchanger, allowing the said glass batch material to flow downwardly by gravity through a plurality of spaced-apart, open-ended tubes of said heat exchanger, passing the hot waste gases of the melting furnace upwardly through said heat exchanger around said open-ended tubes to heat the glass batch material contained therein by indirect heat transfer, recirculating all of the glass batch material rapidly through the tubes of said heat exchanger wherein the mass of said glass batch material is heated by contact with the inner surfaces of said tubes, and removing the collected moisture from a region adjacent the lower end of said tubes, all of said material being recycled at a substantially-faster flow rate than when the said heat exchanger is subsequently and continuously operated to deliver a major portion of the heated glass batch to the melting furnace and a minor portion of the heated glass batch to be recycled through said heat exchanger to maintain a minimum operating temperature.

9. The method in accordance with claim 8, including the step of recycling the said glass batch material through said heat exchanger until essentially all of said glass batch material is heated to a temperature above the boiling point temperature of water.

10. The method in accordance with claim 8, including the step of recirculating the said glass batch material through said heat exchanger at a flow rate of about two to four times the normal rate of operation of said heat exchanger and for a sufficient period until essentially all of the recycled glass batch material is at a temperature above the boiling point temperature of water prior to delivery of any preheated glass batch material to said melting furnace.

* * * * *